D. RONCONI.
SELF SEATING ROTARY VALVE.
APPLICATION FILED JUNE 26, 1918.
1,382,857.
Patented June 28, 1921.
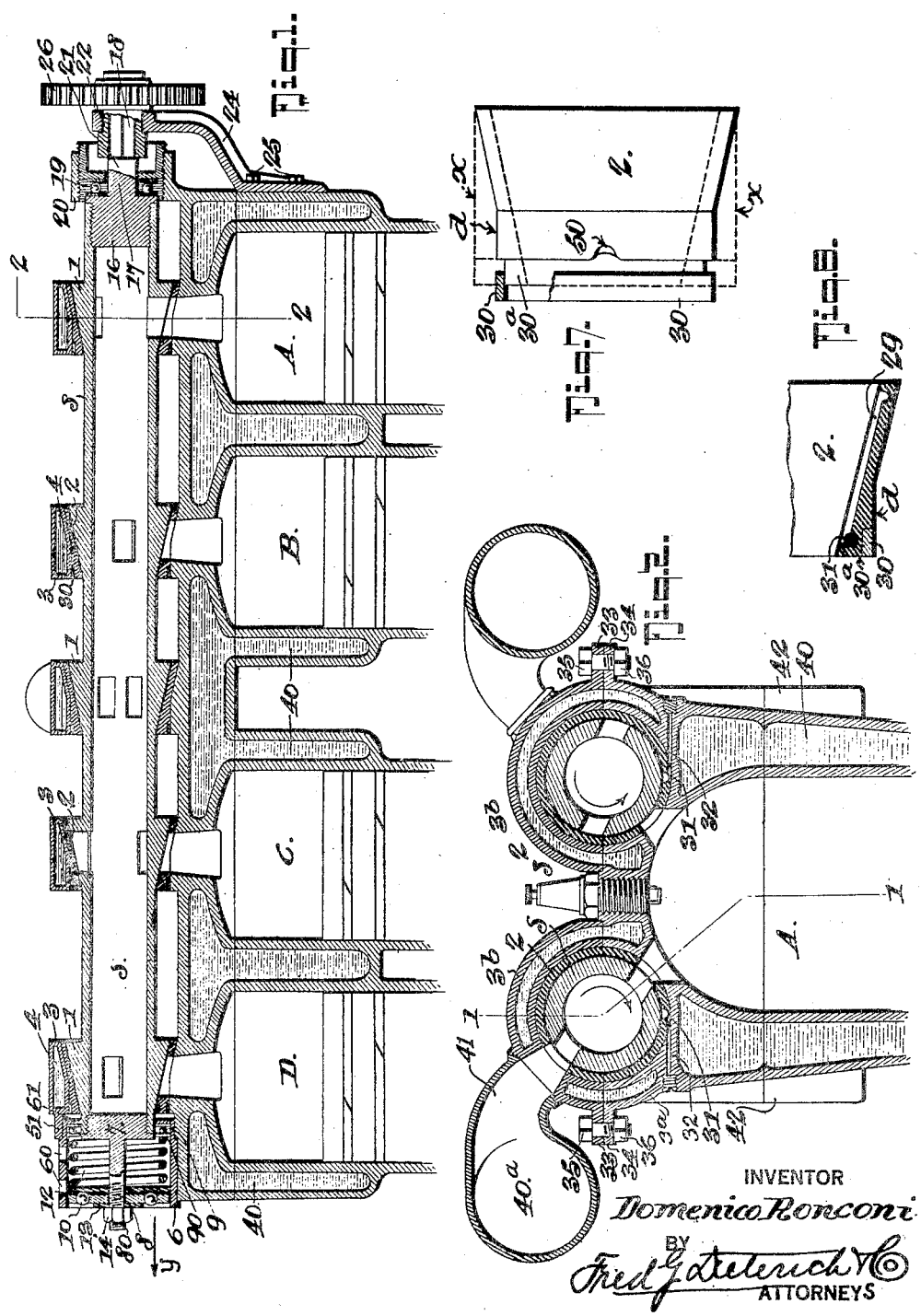
INVENTOR
Domenico Ronconi
BY
Fred G. Dieterich
ATTORNEYS

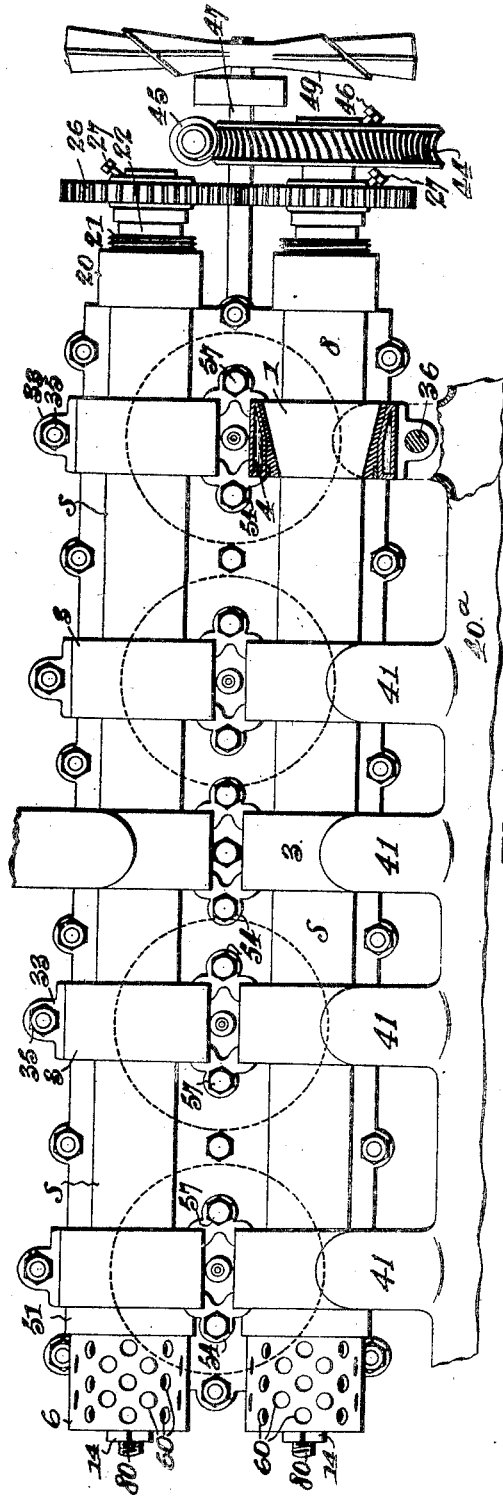
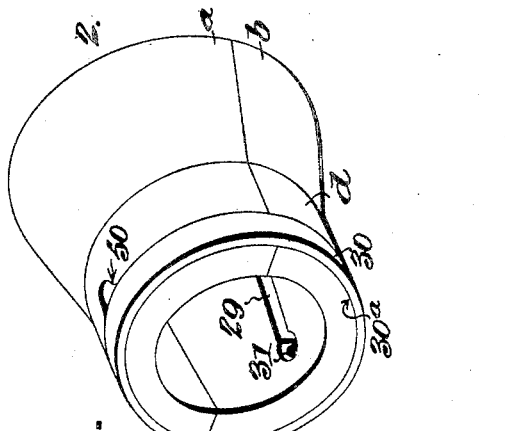
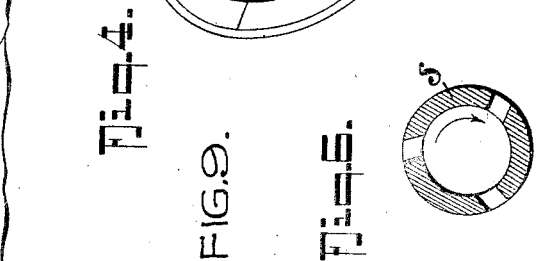
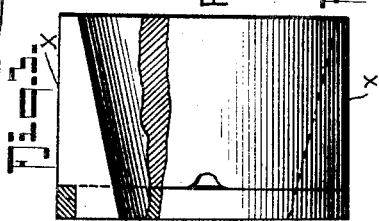
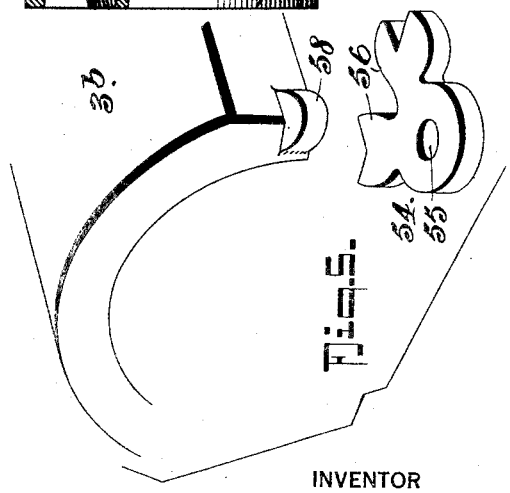

UNITED STATES PATENT OFFICE.

DOMENICO RONCONI, OF CHICAGO, ILLINOIS.

SELF-SEATING ROTARY VALVE.

1,382,857.  Specification of Letters Patent.  Patented June 28, 1921.

Application filed June 26, 1918. Serial No. 242,021.

*To all whom it may concern:*

Be it known that I, DOMENICO RONCONI, a citizen of the United States, residing in Chicago, in the county of Cook and State of Illinois, have invented a new and Improved Self-Seating Rotary Valve, of which the following is a specification.

My present invention has reference to improvements in rotary valve mechanisms for internal combustion engines and more particularly embodies certain improvements in and modifications of the type of self-grinding or seating rotary valve structure disclosed in my Patent No. 1,241,663, dated October 2, 1917.

Primarily, my present invention has for its object to provide an improved arrangement of the intake and exhaust ports for the hollow valve, whereby to reduce the speed of valve rotation relative to that of the crank shaft and the mounting of the hollow valve for reducing the wearing of the said valve.

Another object of my present invention is to provide certain improved features in the type of valve shown in my patent referred to in which is included a cooling surface and means for increasing the time of contact between the valve and its seats or bearing surfaces to increase the efficiency of the valve and means tending to cool the valve and reduce the heating thereof, during its operation, to the minimum.

Another and essential feature of my present invention is the provision of an improved arrangement of the conical bearing portions of the hollow valve, the tapering sleeves and the external housings, whereby the sleeves may be readily fixedly attached to their respective conical bearings and whereby the valve with the sleeves attached may be expeditiously and conveniently placed into the proper operative position within the external or cone-shaped housings.

In its more subordinate features, my present invention consists in an improved construction of water cooling jacket connections for each of the cone bearings for the valve and the peculiar connection thereof with the main or engine cylinders water cooling jacket devices, other combinations and novel arrangement of parts being also included, all of which will be hereinafter explained in detail, specifically pointed out in the appended claims and illustrated in the drawings, in which:

Figure 1 is a longitudinal section of my improved rotary valve mechanism taken substantially on the line 1—1 on Fig. 2.

Fig. 2 is a transverse section thereof, taken substantially on the line 2—2 on Fig. 1.

Fig. 3 is a top view thereof, parts being in horizontal section.

Fig. 4 is a perspective view of one of the sleeve or cuff members hereinafter specifically referred to.

Fig. 5 is a perspective view of one of the clip devices hereinafter explained.

Fig. 6 is a cross sectional view that illustrates a modified construction of the valve hereinafter described in detail.

Fig. 7 is an elevation in part section of the sleeve member.

Fig. 8 is a detail section of the sleeve clearly illustrating the oil feed groove therein.

Fig. 9 is a detail side elevation of a portion of one of the cuff-like members or sleeves 2 and illustrates a modified form of such member hereinafter specifically referred to.

In my present construction of rotary valve, the same general characteristics embodied in my patented valve mechanism, before stated, appear, the differences or modifications in my present form of valve being more particularly provided to simplify the workmanship or manufacture of the coöperating parts to facilitate the cooling of the valves, particularly the exhausting valve, In my present construction, I have shown the valve as provided with the same number of conical or tapered bearing portions, as has my other mentioned valve, but I desire it understood that, if the conical bearing portions corresponding to their coincident engine cylinders are provided with an individual intake or exhaust manifold, the central cones on the intake or exhaust valves may be dispensed with.

In the drawings, I have illustrated so much of a motor engine as is necessary to show a practical application of my improved rotary valve mechanism and the said engine includes four cylinders, designated A, B, C and D, it being understood that while I have shown four cylinders, my valve mechanism is applicable for use with motor engines having a greater or lesser number of cylinders.

In carrying out my present invention, the valve S is a hollow body having a cylindrical bore throughout its length and at points corresponding to the head of the cylinders, the said valve has annularly thickened portions that form cone-like bearings 1, the taper of the said bearings being such that danger of the parts sticking is absolutely overcome.

The cone sleeves or cuff-like members 2 in my present construction, are each formed of two like half sections a—b (one of which is shown in detail in Fig. 4) and they differ from the like sleeves 2 in my patented construction, in that their external faces at the thicker end terminate in annular flat bearing surfaces d, which, in turn, terminate at the outer end in a reduced annular flange or surface 30ᵃ that is provided for receiving a clamping ring 30 that serves to hold the two sections together, when applied onto the conical bearings 1.

While I prefer to form the external face of each of the sleeves as shown in Figs. 1 and 4, since such form provides for a greater water space 4 in their coengaging housings 3, presently again referred to, the said external face of the sleeve 2 may be made straight across as indicated by x—x on Fig. 9.

In either of the aforesaid constructions of the sleeve 2, by having the thickened end turned down to form a flange to receive the ring 30, the work of finishing the sleeve, internally and externally, is much facilitated and at the same time it provides for easily taking the sleeve sections apart, and a groove 50 in the sleeve is provided to receive a suitable tool for pressing the ring 30 off.

In my present construction, the housing 3 at that end or bearing corresponding to the cylinder D need not be split or of two sections and, at that end, the corresponding housing is formed with an annular sleeve-like extension 51, presently again referred to.

In my present construction, each housing member 3 is made hollow to form a water jacket 4 which communicates with the water jacket 40 of the engine cylinder.

By referring more particularly to Fig. 2, it will be seen that the external housings 3 are formed of two sections, the lower portion 3ᵃ being cast with the cylinder head, while the top portion 3ᵇ is a separate casting formed at each of the opposite sides with a flange 33 and, at the internal angles, each of the housings 3 is cast with a horizontal bracket flange 58.

By now referring more particularly to Fig. 3, it will be seen that the flanges 58 are provided to form seat bearings for receiving clip devices 54, one of which is shown in detail in Fig. 5.

Each of the clip devices 54 includes a pair of angled points or members 56—56 which are fitted between the opposing edges of a pair of housings 3 and each is mounted on the bracket flanges 58 and is secured to the top casting 3ᵇ by a single bolt 57 that passes through an aperture 55 in the clip device and screws into the said casting 3ᵇ.

Flanges 33 mate with flanges 34 on the bottom casting 3ᵃ and the said flanges 33—34 are held together, leak tight, by clamp bolts and nuts 35—36, as is clearly shown in Fig. 2.

6 designates a cuff that fits onto the sleeve 51 on the outermost housing 3. In fitting the cuff 6 in place, its inner or solid end 61 is spaced from the outermost housing 3 so as to leave an annular chamber 15 to provide room for the valve to automatically move rearwardly as it wears or grinds down to its seat.

The solid end 61 of the cuff 6 also serves to hold ball bearings 9 for that end of the valve.

The outer end of the valve S, in my present form, is open and it is internally threaded to receive the externally threaded plug-disk 7 that is formed with an outwardly extending stem 8 threaded at its outer end as at 80.

12 designates a stout coil spring that takes around the stem 8, has its inner end bearing on a plate 90 that holds the bearing balls 9 in their race-way and has its outer end held against a disk 10 which in turn is held up against the spring 12 by a ring 11 that is clamped up in place by a washer 13 and a nut 14 which engages the threaded end 80 of the stem 8, as shown.

The sleeve 6 has an offset or shoulder 61 that limits the thrust of the sleeve 6 into the sleeve 51 and, since the spring 12 tends to normally pull the stem 8 in the direction of the arrow y, Fig. 1, such tension keeps the valve bearings 1 at all times against their seats.

At the other or open end, the valve S is internally threaded to receive an externally threaded adjustable plug 16 which is provided with an outwardly extended axial spindle 17, the outer extremity 18 of which is square in cross section.

19—19 designate thrust bearings that are held against the shouldered end of the plug 16 by an adjustable sleeve nut 21 which threads into the threaded housing 20 that is cast with the cylinder head, as is clearly shown in Fig. 1, in which is also included a hollow sleeve 22 that engages the squared end 18 of the spindle 17 to turn therewith, when rotation is imparted to the said stem 22 through the gear 26 that is fixedly attached to the sleeve by a clamp screw 27. A bracket 24 supports the spindle 17 with its attached gear and the said bracket is secured to the cylinder head by screws 25—25.

While any suitable means may be provided for rotating the valve S, I prefer to use a worm drive 45, since such drive provides a noiseless transmission. Gear 45 meshes with a worm wheel 44 mounted on the outer end of the sleeve 22 by a crank screw 46.

47 designates a special arrangement of bracket on which a fan 49 may be suitably mounted and which forms a part of the cooling system and which may be operated by a pulley drive from the engine shaft in any approved manner.

The cuff or sleeve member 6, at the inner end of the valve, has suitable perforations 60 to facilitate cooling the spring 12, when it gets warm.

In my present construction, the valve S, instead of being formed with a single port in line with each conical bearing and corresponding cylinders, has two ports arranged at diametrically opposite points and designated P—P' and the said ports P—P' are of one-half the diameter of the single ports in my other valve structure referred to and such forming and arrangement of the ports P—P' provides for a proper infeed of the working charge and the exhausting of the exploding charges, while the valve is making a relatively slow rotation, in the present instance one-fourth of a revolution to one revolution of the crank shaft or movement of the piston.

Giving the valve a relatively slow movement, as stated, reduces to a minimum the heating of the valve due to the friction, when rotating too fast, it being understood that by reason of the housing, in which the valves turn being water jacketed, the cooling is further augmented because the valve is compelled to remain in longer contact with the water cooled surfaces than is possible in my patented construction.

At this point it should be stated the valves being hollow and relatively thin, they are thereby more quickly cooled than would be possible if they were substantially solid throughout.

On the exhaust valve side, a single exhaust manifold 40ª, see Fig. 3, is provided, which through laterals 41 corresponding to each cone bearing and cylinder, facilitates the expulsion of the burnt gases and absolutely avoids back pressure.

The valves, in my present arrangement, are constantly lubricated either by gravity or a forced feed (pump) system connected with the feeding groove 32 and by the latter through a feed port 31 to a distributing groove 29.

The rotation of the valve is the same as in my patented valve mechanism except that they turn but one-fourth of a revolution instead of a one-half revolution to each complete turn of the crank shaft.

To readily provide for attaching the valve holding framing to the cylinder head, the said framing includes apertured extensions 42—42.

While I have illustrated and described the valve S as provided with but two oppositely disposed ports arranged substantially as shown in Fig. 2, I do not limit myself to a valve construction having the ports arranged as stated, since the speed of the valve's rotation may be reduced by forming the said valve with a greater number of ports, as is illustrated in Fig. 6.

What I claim is:

1. In a rotary valve mechanism of the character stated, the combination with an explosion cylinder including a head, the said head having a valve seat at each of the opposite sides of the explosion chamber, each of such seats having a port in communication with the explosion chamber, a hollow rotary valve in each of the said valve seats, each of said valves having at least one port adapted for intermittently alining with their respective valve seat ports to the explosion chamber, housings that fit over the valves, each of the said housings having opposite bearing members that fit upon and attach to the valve seat portion of the cylinder head, means for securing the said housings fluid tight onto the cylinder head, and intake and exhaust manifold connections that join with the said housings and through the housings with their respective valves.

2. In a rotary valve mechanism of the character described, the combination with an explosion cylinder including a head, the said head having a valve seat at each of the opposite sides of the explosion chamber, each of the said seats having a port that communicates with the explosion chamber, a rotary valve mountable on each of the said valve seats, the said valves each having a port adapted for intermittently alining with their respective valve seat ports to the explosion chamber, a housing over each valve, each housing having opposite bearing members that fit onto the cylinder head, means for securing the housings fluid tight onto the said cylinder head, and intake and exhaust manifold connections that join with the oppositely disposed housings, the aforesaid housing securing means including corner brackets on the inner adjacent portions of the housings, and clamp members attachable to the top of the cylinder head and which include oppositely projected clamping portions for engaging the aforesaid edge brackets of the end bearings of the housing members.

3. In an explosive engine having two or more explosive cylinders, each of which has an induction and an eduction port, a tapering valve casing for each cylinder, each of the said casings having an induction and an eduction port that communicate with their respective explosion cylinders, a hollow cylindrical valve having a plurality of sets of ports mounted in each of the valve casings, one set of such plurality of ports being provided for controlling the ports in each of their respective tapering valve casings, the said valve including tapering portions that engage corresponding seats in their respective valve casing sections for the engine cylinders, and means for holding the valves constantly against the corresponding seats in the valve casing on the engine cylinder, each of the said casing sections including an attached hollow housing portion, the several housing portions constituting water jackets in communication with the engine cylinder water jacket.

DOMENICO RONCONI.